Sept. 1, 1925.
E. A. GOVE
1,551,660
MULTIPLE SHEET FORM
Filed June 8, 1922
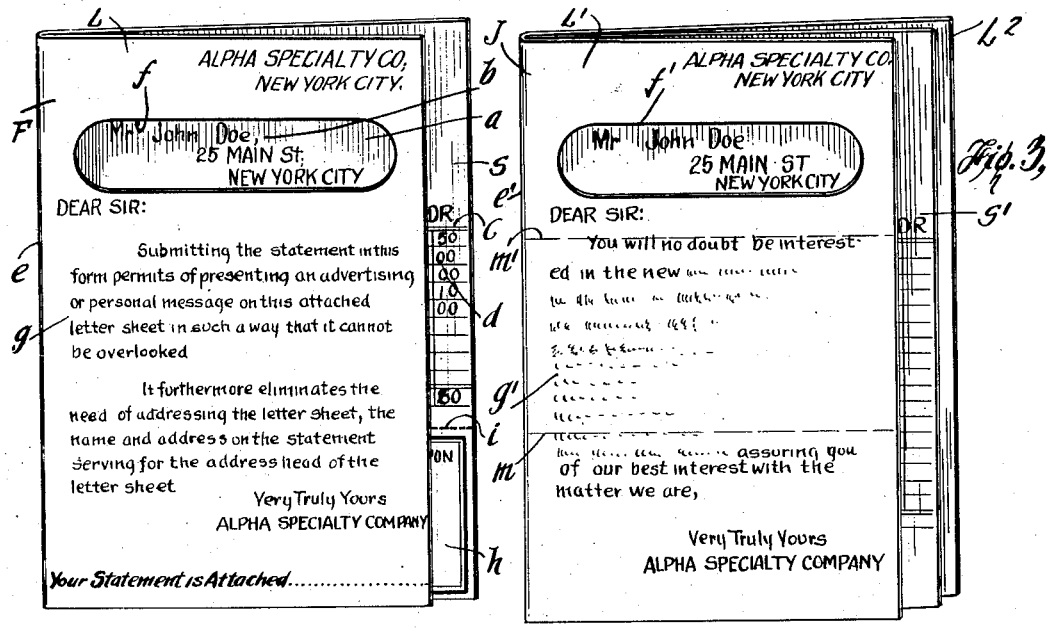
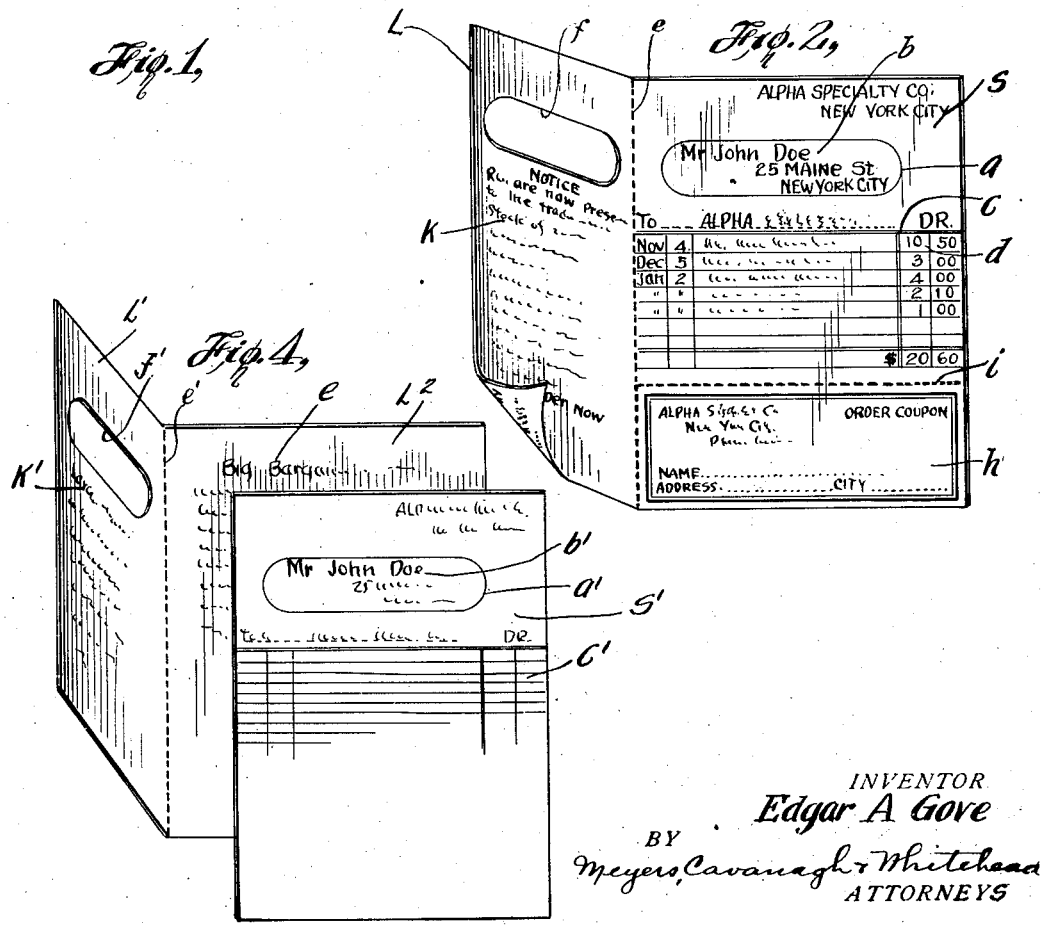
INVENTOR
Edgar A Gove
BY
Meyers, Cavanagh & Whitehead
ATTORNEYS Patented Sept. 1, 1925.

1,551,660

UNITED STATES PATENT OFFICE.

EDGAR A. GOVE, OF NEW YORK, N. Y.

MULTIPLE-SHEET FORM.

Application filed June 8, 1922. Serial No. 566,679.

*To all whom it may concern:*

Be it known that I, EDGAR A. GOVE, a citizen of the United States, and resident of New York city, in the county of New York and State of New York, have invented certain new and useful Improvements in Multiple-Sheet Forms, of which the following is a specification.

The present invention relates to multiple sheet stationery adapted particularly for use by commercial houses and industrial establishments in the advertising and transaction of business and relates more particularly to a combined letter sheet and statement form associated so that the address data appearing on a statement or bill will serve as the address head of the letter sheet.

As is well known, it is the modern practice for business and commercial houses to send forth through the mail thousands of pieces of advertising literature in connection with the particular business that is being conducted and, furthermore, to mail with great frequency, such as weekly or monthly, statements of accounts to various customers, the advertising literature being frequently mailed along with the statements of accounts. This practice is exceedingly expensive, a large item of expense resulting from the practice of separately addressing the advertising literature and the statements. In the case of a large organization having a vast clientele and indulging in extensive circularizing or advertising, the item of expense in connection with this practice in the course of the year runs to large proportions and constitutes an important item in the overhead charges of the concern.

A principal object of my present invention comprehends the provision of a multiple sheet form designed particularly for the use of concerns which indulge in extensive circularizing and advertising mailed with the weekly or monthly statements of account, the invention comprehending an improved letter or advertising sheet and statement form accomplishing the saving of separate addressing operations and the expense attributed to this source.

A co-relative object of the present invention relates to the provision of a combined statement form and letter head associated in such manner that a statement is submitted in a way so that the presenting of an advertising or personal message to the sendee cannot be overlooked and will be given more than casual inspection, as is the case where the statements and the advertising letter heads are dissociated in accordance with the present practice. In the form which I have devised a bill or a statement of account is so associated with the advertising literature as to force the recipient in considering the statement of account to give more than passing attention to the advertising literature received along with the statement.

Furthermore, it is the purpose of the present invention to provide a multiple sheet form which is so constructed as to embody advertising matter descriptive of some particular item in the business of the sendee and a statement of account associated therewith, the statment of account having an address bearing space or section so co-related with the advertising matter sheet that but one writing of the address in connection with the multiple sheet is necessary, the sheet when folded being capable of insertion in a window envelope so that an address written but once on the multiple sheet will serve for the statement, the letter head and the envelope. In other words, although the envelope will contain a multiple sheet embodying a form letter, advertising matter and a statement of account as well as any other desired indicia or information, the writing of only a single address is required.

To the accomplishment of the foregoing and such other objects as may hereinafter appear, my invention consists in the elements and their relation one to the other, as hereinafter particularly described and sought to be defined in the claims, reference being had to the accompanying drawings which show preferred embodiments of my invention, and in which:

Figure 1 is a view showing one form of the multiple sheet structure with the sheets in superposed or folded relation, Figure 2 is a view of the same with the top sheet in opened position, Figure 3 is a view of a modification, and Figure 4 is a view showing the modified sheet structure of Figure 3 in open position.

As heretofore mentioned, a principal object of the invention relates to the provision of a multiple sheet form and more particularly to a combined statement and letter sheet so constructed that a single addressing operation serves for the statement form and for the letter sheet, with the construction such that a statement may be presented along with an advertising or personal message in such a way that the advertising literature cannot be overlooked, or lightly discarded. More specifically, my present invention comprehends, constructionally, a multiple sheet form composed of a plurality of superposed sheets, including a top sheet and an underneath sheet, the underneath sheet being provided with an address blank or space and with a commercial communication such as a statement of account directable to the sendee, whose address may be inscribed or printed in the said space, the top sheet having a "window" cut-out similar to that which distinguishes the so-called window envelope, the said window cut-out being located above the address space of the underneath sheet for exposing the same, the address space serving for an address head in association with the top letter sheet. Referring now to Figures 1 and 2 of the drawings, one form of my invention includes the provision of a folder F comprising the superposed statement and letter sheets S and L respectively. The statement sheet or form S includes the usual address space or blank $a$ adapted for receiving an address such as $b$, the statement further including the usual designated space or blank $c$ for receiving a statement of account such as shown at $d$. The letter sheet L is in this form of my invention attached to the statement form S along the longitudinal fold line $e$, the said line being preferably perforated as indicated in the drawings, to permit ready detachability of the statement form after the letter sheet has served its intended purpose. The letter sheet L is, furthermore, provided with a window cut-out $f$ similar to that which distinguishes the so-called window envelope, the said window being located above the address space $a$ so as to expose the address $b$ thereon, this address serving as a heading for any personal or advertising communication adapted to appear or appearing on a space or blank $g$ arranged below the window $f$. As illustrated in Figure 1 of the drawings, the space or blank $g$ may be provided with a personal or advertising communication addressed to the sendee of the statement S, calling the latter's attention to any desired business communication worthy of notice. The space $g$ in the finished product as marketed may be either in the form of a blank so that any business organization may supply its own literature or may be in the form of a printed advertisement relating to any particular business.

An important feature of the invention relates to the location of the window $f$ so that upon folding of the blank for insertion into an envelope the address $b$ will become visible through the cut-out provided in the window type of envelope, this so that an address written but once on the multiple sheet will serve for the statement, letter sheet and envelope in which these are to be enclosed.

Although the invention comprehends providing the superposed sheets S and L of equal dimensions, these sheets may be made of unequal dimensions, as particularly shown in Figure 1 of the drawings, the underneath sheet S being wider than the top sheet L so that the characteristics of the statement sheet will clearly appear during the reading of the advertising or personal communication appearing on the sheet L, this so that the attention of the sendee is directed to and focused upon the important contents of the underneath sheet and so that the recipient will at a glance observe the subject matters of both superposed sheets.

The statement sheet S may be in the form of an ordinary statement sheet but in this form of my invention I show this sheet S provided with an order coupon or section $h$ attached to the statement sheet S, a perforated line $i$ being provided to permit quick detachability of the order coupon from the rest of the sheet blank structure. In this form of the invention I therefore combine a statement, a return order coupon and a letter sheet in one communication.

The multiple sheet form may be also provided with additional literature and as shown in Figure 2 of the drawings, the reverse side of the top sheet L may be provided with advertising matter designated as $k$. It will be apparent that in this form of the invention, instead of providing a statement sheet S, the underneath sheet may comprise any other commercial communication headed by the addressing blank. In this form of the invention, when the bill or statement is headed up and made out, or if advertising is used, when the title, illustration or stressed feature is properly positioned, either one or the other will show through the cut-out and become part of the letter or advertisement which may be typed or printed on the obverse or upper face of the top letter sheet L.

Referring now to Figures 3 and 4 of the drawings, which show a second form my invention may take, there is provided a folder or jacket J comprising bottom and top sheets $L^2$ and $L'$ attached together along the longitudinal fold line $e'$, the top section or sheet $L'$ comprising the letter sheet and being provided with the elongated window $f'$ and the space $g'$ for a personal or advertising communication. The reverse face of the top sheet $L'$ may also be provided with advertising literature as shown at $k'$ in Figure 4 of the drawings. The obverse face of the underneath or bottom sheet $L^2$ may also, if desired, be provided with additional advertising literature such as indicated at $l$.

In this latter form of my invention the statement sheet S' is preferably detached and removably receivable by the jacket J and positionable between the top and bottom sheets thereof. The statement sheet in this form of my invention may comprise a complete statement form including the usual address space a' adapted to receive the address b' and the space or blank c' therebelow for receiving the usual statement of account. In this form of my invention the dimensions of the statement form may also be somewhat larger than the dimensions of the top sheet L' so as to be observable upon reading of the communication appearing on the letter sheet, and the bottom sheet L² of the jacket J may, if desired, be of dimensions somewhat larger than the dimensions of the statement sheet S' so that any advertising literature appearing on the bottom sheet L² may be partially visible at the same time. In this form of my invention, also, therefore, the commercial form such as the statement sheet S', will show through the window cut-out and will, to all intents and purposes, become part of the letter or advertising typed or printed on the upper or obverse face of the top sheet of the folder.

In addition to the structural form of the folder, my invention also includes the scoring of the folder which will insure a perfect folding of the same. To this end the folder or jacket J may be provided with the scored transverse lines m and m', it being understood that any number of score lines may be provided, according to the number of folds to be made. When this is done the multiple sheet can be easily and accurately folded along the transverse lines in such a way as to insure the top and bottom edges of the top sheet of the folder meeting evenly the top and bottom edges of the other sheets of the folder, with the window f' arranged and located so that the address will appear below the window of an envelope in which the folder is inserted or sealed.

The manner of making and using my multiple sheet structure will, in the main, be apparent from the above detailed description thereof. It will be further apparent that my present invention eliminates the need of separately addressing letter sheets, advertising matter and statements insertible in the same enclosure, the single operation of addressing the statement serving to provide the address head both for the statement and any personal or advertising communication to be sent along therewith. Moreover, it will be apparent that the parts are so related as to effect a multiple sheet construction foldable so that the same address may be visible through the window of an ordinary window envelope. It will be further understood that by combining the statement or similar commercial form with a letter sheet in the manner described, the statement or similar important communication which the recipient must preserve will force the recipient's attention to the letter sheet communication so that the latter is given more than passing attention and is more likely to be carefully perused and studied.

While I have shown my device in the preferred forms, it will be obvious that many changes and modifications may be made in the structure disclosed, without departing from the spirit of the invention, defined in the following claims.

I claim:—

1. As a new article of manufacture, a combined advertising and commercial communication device constructed to be folded transversely for mailing in a so-called "window" envelope, and adapted for use by commercial and industrial establishments in advertising and transacting their business, comprising a multiple-leaf jacket carrying printed matter pertaining to the business of the sender of the article, one of the leaves being narrower than the other in order to expose a marginal portion of the communication appearing on the face of the wider leaf which it overlies, the said narrower leaf having a "window" opening extending transversely thereof near its upper end, and the said wider leaf having a transversely arranged space near its top for address data, which may be seen through the said window opening.

2. As a new article of manufacture, a combined advertising and commercial communication device constructed to be folded and mailed in a so-called "window" envelope and adapted for use by commercial and industrial establishments in advertising and transacting their business, comprising a multiple leaf jacket carrying printed matter pertaining to the business of the sender of the article, one of the leaves being narrower than the other to expose a marginal portion of the communication appearing on the face of the wider leaf which it overlies, the said narrower leaf having a window opening extending transversely thereof near its upper end, and an insert separate from the jacket and of a width substantially equal to that of the wider leaf, said insert carrying a business communication and adapted to be removably inserted between the leaves of the jacket to be enclosed thereby when the jacket is folded transversely to envelope size, and said insert having a transversely arranged space for address data so positioned that said data may be seen through the said window when the insert and jacket are assembled.

3. As a new article of manufacture, a combined advertising and commercial communication device constructed to be folded and mailed in a so-called "window" envelope and adapted for use by commercial and industrial establishments in advertising and transacting their business, comprising a multiple leaf jacket carrying printed matter pertaining to the business of the sender of the article, one of the leaves being narrower than the other to expose a marginal portion of the communication appearing on the face of the wider leaf which it overlies, the said narrower leaf having a window opening extending transversely thereof near its upper end, and a leaf separate from the jacket and of a size substantially equal to that of the wider leaf, one of said wider leaves being ruled to constitute a statement form and having a transversely arranged space near its top for address data which may be seen through the said window opening when the leaves are assembled.

4. As a new article of manufacture, a combined advertising and commercial communication device constructed to be folded and mailed in a so-called "window" envelope and adapted for use by commercial and industrial establishments in advertising and transacting their business, comprising a multiple leaf jacket carrying printed matter pertaining to the business of the sender of the article, one of the leaves being narrower than the other to expose a marginal portion of the communication appearing on the face of the wider leaf which it overlies, the said narrower leaf having a window opening extending transversely thereof near its upper end, a leaf separate from the jacket and of a size substantially equal to that of the wider leaf, one of said wider leaves being ruled to constitute a statement form and having a transversely arranged space near its top for address data which may be seen through the said window opening when the leaves of the folder are assembled, and one of said leaves also carrying a detachable "order" form to be filled in and returned to the sender.

Signed at New York city, in the county of New York and State of New York this 6th day of June A. D. 1922.

EDGAR A. GOVE.